United States Patent
Ghasemi et al.

(10) Patent No.: US 12,511,460 B2
(45) Date of Patent: Dec. 30, 2025

(54) HARDWARE ACCELERATION OF MACHINE LEARNING DESIGNS

(71) Applicant: Xilinx, Inc., San Jose, CA (US)

(72) Inventors: Ehsan Ghasemi, San Jose, CA (US); Rajeev Patwari, San Jose, CA (US); Elliott Delaye, San Jose, CA (US); Jorn Tuyls, Dublin (IE); Ephrem C. Wu, San Mateo, CA (US); Xiao Teng, Cupertino, CA (US); Sanket Pandit, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 805 days.

(21) Appl. No.: 17/806,906

(22) Filed: Jun. 14, 2022

(65) Prior Publication Data

US 2023/0401480 A1   Dec. 14, 2023

(51) Int. Cl.
*G06F 30/327* (2020.01)
*G06N 20/00* (2019.01)

(52) U.S. Cl.
CPC .......... *G06F 30/327* (2020.01); *G06N 20/00* (2019.01)

(58) Field of Classification Search
USPC ...................................................... 716/117
See application file for complete search history.

(56) References Cited

U.S. PATENT DOCUMENTS

2022/0343135 A1 *  10/2022  Naderiparizi .......... G06N 3/045

OTHER PUBLICATIONS

Diganta Misra, Mish: A Self Regularized Non-Monotonic Activation Function, Misra: Mish Activation Function, arXiv:1908.08681v3 [cs.LG] Aug. 13, 2020, 14 pages.
Ashish Vaswani, et al., Attention Is All You Need, 31st Conference on Neural Information Processing Systems (NIPS 2017), Long Beach, CA, USA, arXiv:1706.03762v5 [cs.CL] Dec. 6, 2017, 15 pages.
Design and Architecture, tvm 0.9.dev0 documentation, https://tvm.apache.org/docs/arch/index.html, 7 pages.
Use Tensorize to Leverage Hardware Intrinsics tvm 0.9.dev0 documentation, https://tvm.apache.org/docs/how_to/work_with_schedules/tensorize.html, 7 pages.

* cited by examiner

*Primary Examiner* — Bryce M Aisaka
(74) *Attorney, Agent, or Firm* — Kevin T. Cuenot

(57) ABSTRACT

Hardware acceleration of machine learning (ML) designs includes translating an ML primitive into an intermediate representation. The intermediate representation is subdivided to specify a functional compute block. The functional compute block is sized according to a compute node primitive adapted for implementing the ML primitive on target hardware. An overlay is generated for the ML primitive, at least in part, by mapping the functional compute block to the compute node primitive. The overlay is synthesizable to implement the ML primitive on the target hardware. The overlay can be scheduled for operation within the target hardware as part of an ML design including the ML primitive.

20 Claims, 11 Drawing Sheets

```
i = te.reduce_axis((0, I), name='i')
A = te.placeholder((V, I), name='A')
W = te.placeholder((I, H), name='W')
res = te.compute((V, H), lambda v, h: te.sum(A[v, i] * W[i, h], axis=i), name='res')
```

FIG. 2

```
primfn(A_1: handle, W_1: handle) -> ()
    attr = {"global_symbol": "main", "tir.noalias": True}
        buffers = {W: Buffer(W_2: Pointer(float32), float32, [512, 512], []),
            A: Buffer(A_2: Pointer(float32), float32, [512, 512], [])}
    buffer_map = {A_1: A, W_1: W} {
    attr [res: Pointer(float32)] "storage_scope" = "global"; allocate(res, float32, [262144]);
    for (v: int32, 0, 512) {
        for (h: int32, 0, 512) {
            res[((v*512) + h)] = 0f32
            for (i: int32, 0, 512) {
                res[((v*512) + h)] = ((float32*)res[((v*512) + h)] + ((float32*)A_2[((v*512) + i)]*(float32*)W_2[((i*512) + h)]))
            }
        }
    }
}
```

FIG. 3

```
primfn(A_1: handle, W_1: handle) -> ()
    attr = {"global_symbol": "main", "tir.noalias": True}
        buffers = {W: Buffer(W_2: Pointer(float32), float32, [512, 512], []),
                   A: Buffer(A_2: Pointer(float32), float32, [512, 512], [])}
    buffer_map = {A_1: A, W_1: W} {
    attr [res: Pointer(float32)] "storage_scope" = "global";
    allocate(res, float32, [262144]);                                    ⎯ 402
    for (v.outer: int32, 0, 8) {
        for (h.outer: int32, 0, 8) {
            for (v.inner: int32, 0, 64) {
                for (h.inner: int32, 0, 64) {
                    res[((((v.outer*32768) + (v.inner*512)) + (h.outer*64)) + h.inner)] = 0f32
                    for (i: int32, 0, 512) {
                        res[((((v.outer*32768) + (v.inner*512)) + (h.outer*64)) + h.inner)] =
(float32*)res[((((v.outer*32768) + (v.inner*512)) + (h.outer*64)) + h.inner)] + ((float32*)A_2[(((v.outer*32768) +
(v.inner*512)) + i)]*(float32*)W_2[(((i*512) + (h.outer*64)) + h.inner)]))
                    }
                }
            }
        }
    }
}
```

FIG. 4

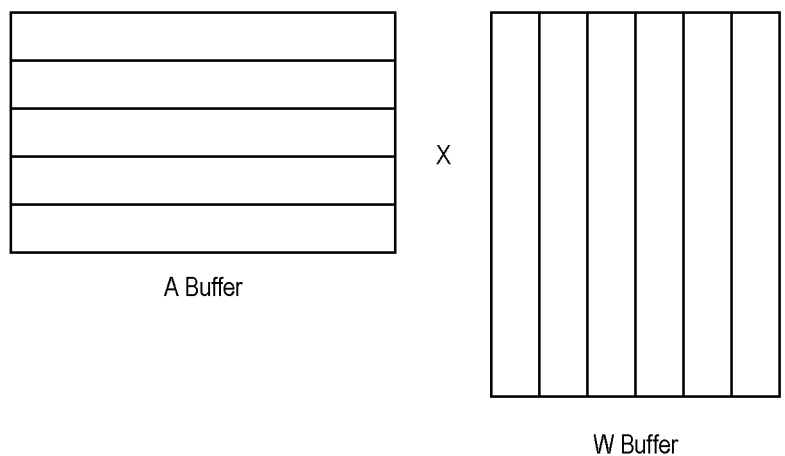

FIG. 5

```
primfn(A_1: handle, W_1: handle) -> ()
  attr = {"global_symbol": "main", "tir.noalias": True}
  buffers = {W: Buffer(W_2: Pointer(float32), float32, [512, 512], []), A: Buffer(A_2: Pointer(float32), float32,
             [512, 512], [])}
  buffer_map = {A_1: A, W_1: W} {
  attr [res: Pointer(float32)] "storage_scope" = "global"; allocate(res, float32, [262144]);
  for (v.outer: int32, 0, 8) {
    for (h.outer: int32, 0, 8) {
      for (v.inner: int32, 0, 64) {
        for (h.inner: int32, 0, 64) {
          res[((((v.outer*32768) + (v.inner*512)) + (h.outer*64)) + h.inner)] = 0f32        ⟵ 602
          for (i.outer: int32, 0, 8) {
            for (i.inner: int32, 0, 64) {
              res[((((v.outer*32768) + (v.inner*512)) + (h.outer*64)) + h.inner)] =
((float32*)res[((((v.outer*32768) + (v.inner*512)) + (h.outer*64)) + h.inner)] + ((float32*)A_2[((((v.outer*32768)
+ (v.inner*512)) + (i.outer*64)) + i.inner)]*(float32*)W_2[((((i.outer*32768)
+ (i.inner*512)) + (h.outer*64)) + h.inner)]))
            }
          }
        }
      }
    }
  }
}
```

FIG. 6

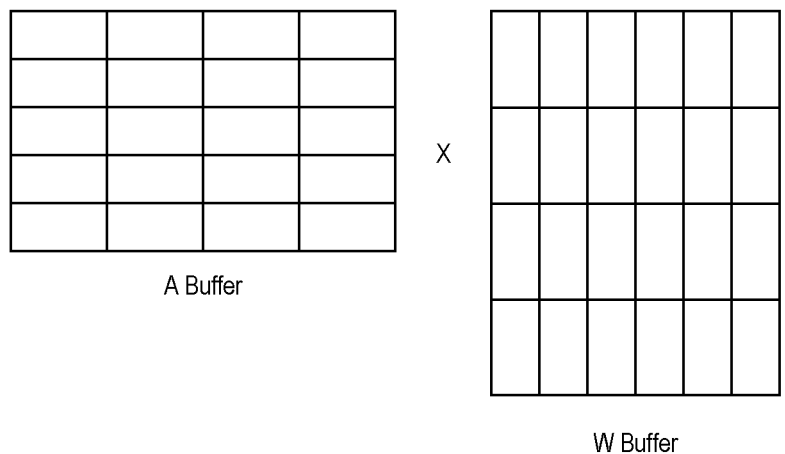

FIG. 7

```
1   primfn(A_1: handle, W_1: handle) -> ()
2     attr = {"global_symbol": "main", "tir.noalias": True}
3     buffers = {W: Buffer(W_2: Pointer(float32), float32, [512, 512], []), A: Buffer(A_2: Pointer(float32), float32, [512,
4     512], [])}
5     buffer_map = {A_1: A, W_1: W} {
6     attr [res: Pointer(float32)] "storage_scope" = "global";
7     allocate(res, float32, [262144]);
8     attr [A.shared: Pointer(float32)] "storage_scope" = "shared";
9     allocate(A.shared, float32, [32768]);
10    attr [A.shared.local: Pointer(float32)] "storage_scope" = "local";
11    allocate(A.shared.local, float32, [64]);
12    for (v.outer: int32, 0, 8) {
13     for (h.outer: int32, 0, 8) {
14      for (ax0: int32, 0, 64) {
15       for (ax1: int32, 0, 512) { "pragma=shim.dma"
16        A.shared[((ax0*512) + ax1)] = (float32*)A_2[(((v.outer*32768) + (ax0*512)) + ax1)]
17        W.shared[((ax0*512) + ax1)] = (float32*)W_2[(((v.outer*32768) + (ax0*512)) + ax1)]
18       }
19      }
20      for (v.inner: int32, 0, 64) {
21       for (h.inner: int32, 0, 64) {{ "pragma= memtile.dma"
22        res[((((v.outer*32768) + (v.inner*512)) + (h.outer*64)) + h.inner)] = 0f32
23        for (i.outer: int32, 0, 8) {
24         for (ax1_1: int32, 0, 64) {
25          A.shared.local[ax1_1] = (float32*)A.shared[(((v.inner*512) + (i.outer*64)) + ax1_1)]
25         }
26    res[((((v.outer*32768) + (v.inner*512)) + (h.outer*64)) + h.inner)] = ((float32*)res[((((v.outer*32768) +
27    (v.inner*512)) + (h.outer*64)) + h.inner)] +
28    ((float32*)A_2[((((v.outer*32768) + (v.inner*512)) + (i.outer*64)) + i.inner)]*(float32*)W_2[(((((i.outer*32768) +
29    (i.inner*512)) + (h.outer*64)) + h.inner)]))
30    }
31    }
32  }
```

```
primfn(A_1: handle, W_1: handle) -> ()
attr = {"global_symbol": "main", "tir.noalias": True}
buffers = {W: Buffer(W_2: Pointer(float32), float32, [512, 512], []), A: Buffer(A_2: Pointer(float32),
float32, [512, 512], [])}
buffer_map = {A_1: A, W_1: W} {
  attr [res: Pointer(float32)] "storage_scope" = "global";
  allocate(res, float32, [262144]);
  attr [A.shared: Pointer(float32)] "storage_scope" = "shared";
  allocate(A.shared, float32, [32768]);
  attr [A.shared.local: Pointer(float32)] "storage_scope" = "local";
  allocate(A.shared.local, float32, [64]);
  for (v.outer: int32, 0, 8) {
    for (h.outer: int32, 0, 8) {
      for (ax0: int32, 0, 64) {
        for (ax1: int32, 0, 512) {"pragma=shim.dma"
          A.shared[((ax0*512) + ax1)] = (float32*)A_2[(((v.outer*32768) + (ax0*512)) + ax1)]
          W.shared[((ax0*512) + ax1)] = (float32*)W_2[(((v.outer*32768) + (ax0*512)) + ax1)]
        }
      }
      for (v.inner: int32, 0, 64) {
        for (h.inner: int32, 0, 64) {"pragma= memtile.dma"
          res[((((v.outer*32768) + (v.inner*512)) + (h.outer*64)) + h.inner)] = 0f32
          for (i.outer: int32, 0, 8) {
            for (ax1_1: int32, 0, 64) {
              A.shared.local[ax1_1] = (float32*)A.shared[((((v.inner*512) + (i.outer*64)) + ax1_1)]
            }
          }
          res[((((v.outer*32768) + (v.inner*512)) + (h.outer*64)) + h.inner)] = ((float32*)res[((((v.outer*32768) +
            (v.inner*512)) + (h.outer*64)) + h.inner)] +
            ((float32*)A_2[((((v.outer*32768) + (v.inner*512)) + (i.outer*64)) +
            i.inner)]*(float32*)W_2[((((i.outer*32768) + (i.inner*512)) + (h.outer*64)) + h.inner)]))
        }
      }
    }
  }
}
```

1002

```
Gemm inst;

int main () {
  // allocate global mem
  // load data && create local buff to pass to the kernel
  // Run Layers ML primitives and operations prior to this code block
  // Perform any preprocessing and formatting
  for (int v_out =0; v_out < 8; v_out++)
    for (int h_out =0; h_out < 8; h_out++)
      // copy section of data to local buffs
      inst.run(1)
  // copy result to global mem
  // Run Subsequent Operations
  // if applicable, schedule the same Gemm overlay for other sections of the ML
}
IR
```

HARDWARE ACCELERATION OF MACHINE LEARNING DESIGNS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to hardware acceleration of machine learning designs.

BACKGROUND

Machine learning (ML) designs continue to evolve over time to include a variety of software-based operations. These operations have grown increasingly complex. The conventional approach for implementing an ML design in a hardware accelerator has been to manually analyze the algorithm of each operation of the ML design, where each operation is typically expressed in program code as a layer. Hardware implementations of the various operations are manually generated based on the algorithmic analysis and based on the particular hardware accelerator selected for accelerating the ML design.

Thus, each hardware adaptation of an operation of an ML design is customized, manually generated, and suitable only for the chosen hardware accelerator. This process tends to be time-consuming, inefficient, and cumbersome. The manual nature of the process and the dependency of the process on the particular hardware accelerator to be used means that any ML design that is adapted for hardware acceleration is not portable to a different hardware accelerator. Further, the ML design must undergo processing anew for each subsequent generation of the hardware accelerator.

SUMMARY

In one or more example implementations, a method can include translating a machine learning (ML) primitive into an intermediate representation. The method can include subdividing the intermediate representation to specify a functional compute block. The functional compute block is sized according to a compute node primitive adapted for implementing the ML primitive on target hardware. The method can include generating an overlay for the ML primitive, at least in part, by mapping the functional compute block to the compute node primitive. The overlay is synthesizable to implement the ML primitive on the target hardware. The method can include scheduling the overlay for operation within the target hardware as part of an ML design including the ML primitive.

In one or more example implementations, a system includes a processor configured to initiate operations. The operations can include translating an ML primitive into an intermediate representation. The operations can include subdividing the intermediate representation to specify a functional compute block. The functional compute block is sized according to a compute node primitive adapted for implementing the ML primitive on target hardware. The operations can include generating an overlay for the ML primitive, at least in part, by mapping the functional compute block to the compute node primitive. The overlay is synthesizable to implement the ML primitive on the target hardware. The operations can include scheduling the overlay for operation within the target hardware as part of an ML design including the ML primitive.

In one or more example implementations, a computer program product includes one or more computer-readable storage media, and program instructions collectively stored on the one or more computer-readable storage media. The program instructions are executable by computer hardware to initiate operations. The operations can include translating an ML primitive into an intermediate representation. The operations can include subdividing the intermediate representation to specify a functional compute block. The functional compute block is sized according to a compute node primitive adapted for implementing the ML primitive on target hardware. The operations can include generating an overlay for the ML primitive, at least in part, by mapping the functional compute block to the compute node primitives. The overlay is synthesizable to implement the ML primitive on the target hardware. The operations can include scheduling the overlay for operation within the target hardware as part of an ML design including the ML primitive.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example of source code specifying an ML primitive.

FIG. 3 illustrates an example of an intermediate representation (IR) of the ML primitive of FIG. 2 as generated in connection with FIG. 1.

FIG. 4 illustrates an example of an ML primitive that implements a matrix multiplication problem that the system has subdivided into smaller portions.

FIG. 5 is a visual illustration of the matrix multiplication subdivisions of FIG. 4.

FIG. 6 illustrates an example in which the system has further subdivided the matrix multiplication operation of FIG. 4.

FIG. 7 is a visual illustration of the matrix multiplication subdivisions of FIG. 6.

FIG. 8 illustrates an example of the ML primitive after the system has inserted one or more compiler directives therein.

FIG. 9 illustrates an example of a synthesizable overlay generated from an ML primitive.

FIG. 10 illustrates an example of scheduling program code generation.

DETAILED DESCRIPTION

Figure 1:
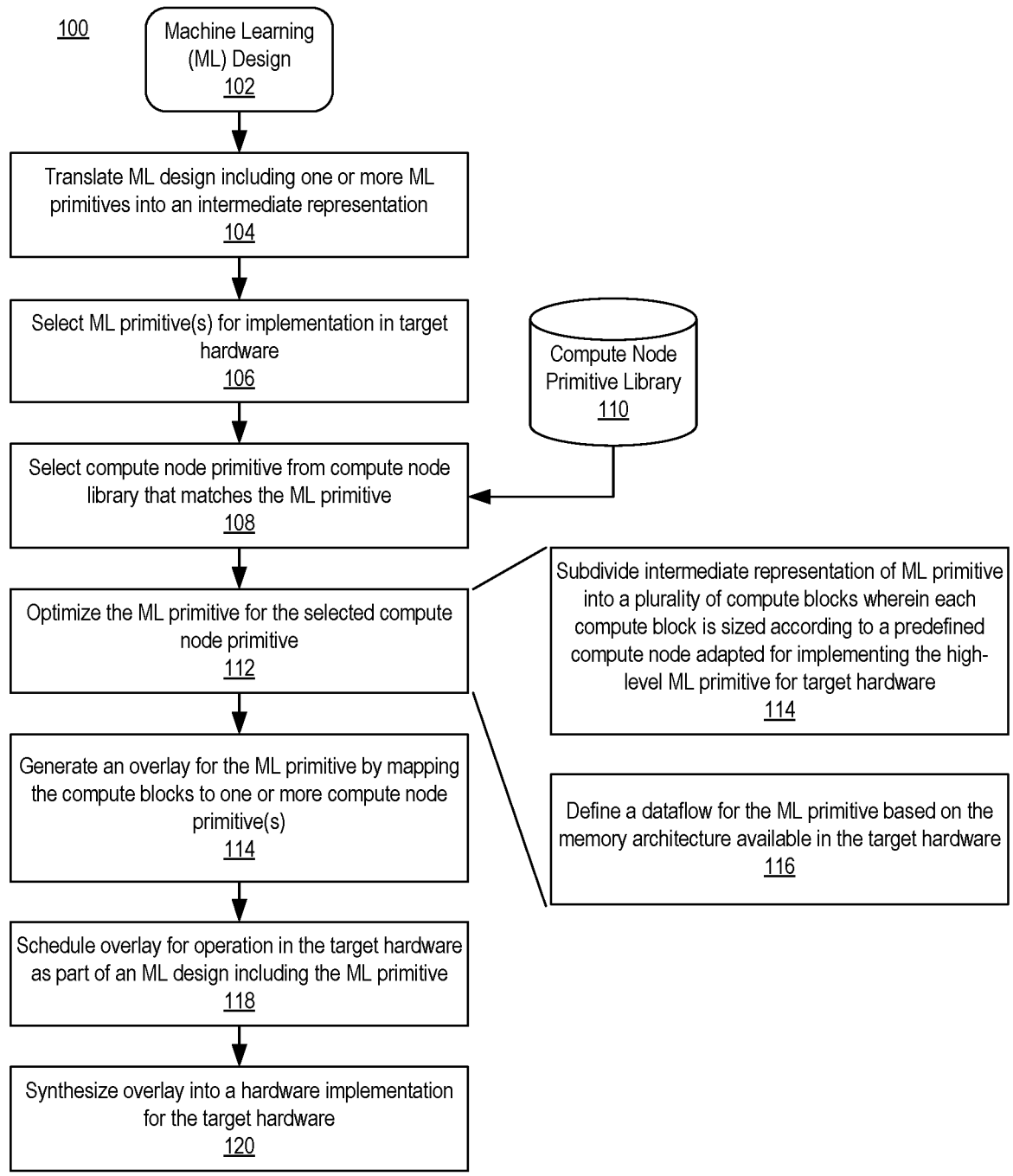
FIG. 1 illustrates an example method of hardware accelerating a machine learning (ML) design.

This disclosure relates to hardware acceleration of machine learning designs. Machine learning (ML) is a branch of artificial intelligence (AI) and computer science capable of improving automatically through experience and through the processing of data. An ML design may be formed of a sequence of layers that form a multilayered computational architecture. To hardware accelerate all or a portion of an ML design, the different layers of the ML design are mapped onto available resources of the target hardware.

The example implementations described herein are capable of hardware accelerating ML designs. In one or more example implementations, the ML designs may be hardware accelerated using a class of hardware referred to as "adaptive hardware." Adaptive hardware refers to a device such as an integrated circuit (IC) that may be updated subsequent to deployment of the device into the field. The adaptive hardware may be optimized, e.g., configured or reconfigured, for performing particular operations after deployment. The optimization may be performed repeatedly over time to meet different requirements or needs.

In accordance with the inventive arrangements described within this disclosure, an ML design may be hardware accelerated through an automated process that implements the ML design, or a portion thereof, on target hardware. In one aspect, one or more portions of the ML design, e.g., ML primitives or layers, may be compiled into a parallel and custom circuit architecture specified as an overlay that accelerates the ML primitive(s). The compilation techniques described herein are capable of automating the generation of a hardware architecture implemented on target hardware thereby reducing the design and compilation time needed to create a high-performance, parallel hardware architecture for hardware accelerating the ML primitive.

In another aspect, the target hardware may be adaptive hardware. The ML primitive may be implemented using any of a variety of different resources of the target hardware. For example, the ML primitive may be realized using one or more compute circuits. Examples of compute circuits include compute tiles of a data processing array, a circuit implemented in programmable logic, one or more central processing units (CPUs), and/or one or more Graphics Processing Units (GPUs) that may be included in the target hardware and that have shared memory access.

In another aspect, the problem space defining a layer of an ML design may be subdivided into portions that may be implemented as a compute node in the target hardware. The layer may be subdivided into functional compute blocks. The functional compute blocks may be mapped to a compute node that is formed of one or more compute node primitives as mapped onto available hardware resources of the target hardware. Each compute node and the compute node primitives that form the compute node are optimized or adapted for use with the target hardware. The system also defines the temporal (e.g., dataflow) and spatial (e.g., scheduling) relationship between the various compute node(s) and/or compute node primitives to which the functional compute blocks are mapped.

Based on the compute nodes, compute node primitives, and the dataflows, the system generates an overlay. In one aspect, the overlay is generated by mapping the ML primitives to the compute node(s). The overlays may utilize parallelism to implement more computationally intense operations. The overlay is synthesizable into a hardware implementation for the target hardware. For example, the overlay may be processed by a compiler for the particular target hardware used to hardware accelerate the ML design. The overlay supports the custom ML workload and is capable of running the ML design.

It should be appreciated that the inventive arrangements described herein may be used to hardware accelerate ML designs as the design changes over time. The inventive arrangements also may be used to ensure portability of a given ML design to subsequent versions of the target hardware and/or to different target hardware. Further aspects of the inventive arrangements are described below with reference to the figures.

FIG. 1 illustrates an example method 100 of hardware accelerating an ML design. The operations described in connection with FIG. 1 may be performed by a data processing system (system) executing suitable program code. The system may be an Electronic Design Automation (EDA) system. The system, for example, is capable of executing an ML compiler to perform one or more of the operations described herein. In one aspect, the ML compiler is a Tensor Virtual Machine (TVM) for machine learning that is capable of implementing a TVM software stack. The system may also execute a compiler for the particular target hardware used to hardware accelerate the ML design referred to herein as a "back-end compiler." An example of a data processing system that is capable of performing the operations described with reference to FIG. 1 is described in connection with FIG. 14.

Method 100 may begin in a state where an ML design 102 is specified that includes one or more ML primitives. As defined within this disclosure, the term "ML primitive" means a type of layer of an ML design implemented as a multi-layered network (e.g., an artificial neural network referred to herein as a neural network). For example, in the case of an ML design specifying a neural network, an ML primitive is a layer of the neural network. Examples of different types of ML primitives include, but are not limited to, a fully connected layer, a convolutional layer, a recurrent neural network layer (e.g., long short-term memory cells), a matrix-multiply layer, an aggregation layer, a pooling layer, activation layers including, but not limited to, a Rectified Linear Unit (ReLu) layer, a Softmax layer, a hyperbolic tangent (tan h) layer, an identity function layer, and/or the like.

ML design 102 may be specified in any of a variety of programming and/or ML modeling languages. The programming languages may be high-level programming languages. Examples of high-level programming languages include C/C++ and the like. In general, to hardware accelerate ML design 102, the system compiles ML design 102 into a format that may be mapped onto available hardware resources, e.g., circuits, of the particular target hardware to be used for hardware acceleration. For purposes of illustration, FIG. 1 begins in a state where the system receives ML design 102 for compilation.

In block 104, the system is capable of translating ML design 102 into an intermediate representation. As defined within this disclosure, the term "intermediate representation" is code, specified as a data structure, used internally by a compiler or a virtual machine to represent a machine learning workload. In the example of FIG. 1, the system translates the source code defining ML design 102, e.g., one or more workloads, into an intermediate representation to perform further operations.

An intermediate representation is designed to be conducive to further processing, such as optimization, of a machine learning workload and further translation of the machine learning workload into an executable or a hardware implementation. The term "machine learning workload" refers to a set of operations defined by an ML design that are performed in hardware or a combination of hardware and software to realize the ML design. A machine learning workload may refer to the operations that implement a particular layer or a plurality of layers. An intermediate representation is an accurate representation of the machine learning workload that is capable of representing the machine learning workload without loss of information. The intermediate representation is independent of any particular source or target language. In some cases, the intermediate representation may use a static single assignment (SSA) compliant form. Examples of intermediate representations include, but are not limited to, stack machine code, two address code, three address code, and/or a graph data structure. Other examples of intermediate representations may include, but are not limited to, Low Level Virtual Machine (LLVM) intermediate representation and GNU Compiler Collection (GCC) intermediate representation.

In one or more example implementations, the system translates ML design 102 into an intermediate representation that is TVM-specific. In a TVM-specific intermediate representation, the system is capable of breaking down all operations into a set of mathematical operations and for-loop structures. For example, the system is capable of translating ML design 102 into a Relay Intermediate Representation, which specifies a computational (dataflow) graph. In general, in Relay Intermediate Representation, each node corresponds to a CallNode (e.g., a dataflow node corresponding to a function call).

FIG. 2 illustrates an example of source code specifying an ML primitive. The example ML primitive may be included in a larger ML design such as ML design 102. For purposes of illustration, the ML primitive implements a matrix multiplication operation.

FIG. 3 illustrates an example of an intermediate representation of the ML primitive of FIG. 2 as generated in block 104 by the system.

In block 106, the system selects an ML primitive, now specified in the intermediate representation. The particular ML primitive that is selected is one that may be hardware accelerated using the target hardware. For example, one or more selected layers of a given ML design may be hardware accelerated while other layers that are not hardware accelerated may be executed using a CPU or other processor such as a GPU. In other examples, each layer of ML design 102 may be hardware accelerated. In one aspect, the particular layer(s) of the ML design 102 that are to be hardware accelerated may be indicated using identifiers within the source code that may be translated into the intermediate representation and detected by the system.

In block 108, the system is capable of selecting a compute node primitive from a compute node primitive library 110 that matches the ML primitive selected in block 106. In one aspect, compute node primitive library 110 may include a plurality of different compute node primitives. As defined within this disclosure, the term "compute node primitive" means an indivisible design unit for implementing an ML primitive (e.g., performing a type of ML operation as expressed in an ML primitive or a portion of an ML primitive). A compute node primitive is hardware-specific and as such, is intended to implement the ML primitive or a portion thereof on a particular resource of particular hardware. For example, given the availability of one or more different circuits on the target hardware, a compute node primitive is data, e.g., configuration data and/or program code, that configures or programs a particular type of the circuit on the target hardware to implement the ML primitive or a portion of the ML primitive.

Compute node primitive library 110 may include compute node primitives that are capable of implementing different types of ML primitives including, but not limited to, a fully connected layer, a convolutional layer, a recurrent neural network layer (e.g., a long short-term memory cell), a pooling layer, Rectified Linear Unit (ReLu) layer, a matrix-multiply layer, an aggregation layer, or the like. The system is capable of matching the selected ML primitive with a compute node primitive capable of performing the operation of the selected ML primitive.

As an illustrative and non-limiting example, consider the case in which the selected layer of ML design 102 performs a large matrix multiplication operation having dimensions of N×M. The system selects a compute node primitive that is capable of performing matrix multiplication. The selected compute node primitive, for example, may be capable of performing a matrix multiplication operation that is smaller in size than the selected layer being implemented. For example, the selected compute node primitive may be capable of performing an R×T matrix multiplication operation, where R<N and/or T<M. The layer may be implemented in hardware as a set of one or more compute nodes. In this example, each compute node is formed of one or more compute node primitives. Each compute node may be mapped onto one or more resources (e.g., compute circuits) of the target hardware. In this regard, the term "compute node" refers to data, e.g., configuration data and/or program code, that configures or programs one or more particular compute circuits on the target hardware to implement one or more compute node primitives.

In another aspect, compute node primitive library 110 may include different versions of compute node primitives where each different version of a particular compute node primitive is adapted to be implemented or mapped to a different type of hardware resource on the target hardware. As an illustrative and non-limiting example, compute node primitive library 110 may include a first version of a matrix multiplication compute node primitive that is adapted for implementation in a compute circuit implemented as programmable circuitry, a second matrix multiplication compute node primitive that is adapted for implementation in a compute circuit implemented as a compute tile of an array of compute tiles (e.g., as described herein in connection with FIGS. 11 and 12), as a third matrix multiplication compute node primitive that is adapted for implementation in a compute circuit implemented as a CPU, and/or yet a fourth matrix multiplication compute node primitive that is adapted for implementation in a compute circuit implemented as a GPU. In one aspect, the particular type of target hardware (e.g., programmable logic, an array of compute tiles, etc.) may be specified as a preference, e.g., a user-specified preference, upon initiation of method 100.

In block 112, the system is capable of performing an optimization phase on the ML primitive. The operations performed by the system as part of the optimization phase of block 112 are specific to the target hardware and the compute node primitives to be used. As noted, the target hardware may be adaptable hardware that is reconfigurable in the field. As illustrated, block 112 may include two sub-phases shown as blocks 114 and 116.

In block 114, the system is capable of subdividing the intermediate representation of the ML primitive into a functional compute block. The functional compute block is sized according to the selected compute node primitive. The functional compute block is smaller in size than the initial ML primitive. In one or more example implementations, the functional compute block, as created by the system through the subdividing, is sized to be wholly implemented by a corresponding one of the compute node primitives.

In one aspect, the system performs the subdivision by tiling and/or slicing the loop structures of the intermediate representation of the ML primitive. The tiling and/or slicing subdivides the ML primitive into smaller subproblems. In this example, the tiling and/or slicing subdivides the ML primitive into smaller matrix multiplication problems. In general, slicing refers to a linear subdivision of a given problem into smaller slices. Tiling refers to subdividing a two-dimensional space.

FIG. 4 illustrates an example of an ML primitive that implements a [512,512] matrix multiplication problem that the system has subdivided, e.g., sliced, into smaller portions. The modifications to the loop structure as implemented by the system are illustrated in bold within block 402. In the example, the system has divided the larger matrix multiplication operation of the ML primitive into smaller tasks.

FIG. 5 is a visual illustration of the subdivisions created in FIG. 4. The example of FIG. 5 illustrates the slicing operation as applied to buffers A and W.

FIG. 6 illustrates an example where the system has further subdivided the matrix multiplication operation of FIG. 4. In the example of FIG. 6, the system performed a tiling operation that subdivides the inner dimension of the matrix multiplication operation to specify a functional compute block that conforms in size to the selected compute node primitive. In the example, the system has subdivided the matrix into 8 different [64,512] matrix multiplication problems (e.g., functional compute blocks). The changes are illustrated in bold in box 602.

FIG. 7 is a visual illustration of the matrix subdivisions of the example of FIG. 6. The example of FIG. 7 illustrates the tiling operation as applied to the buffers A and W.

In block 116, the system is also capable of determining dataflows and memory locality for the plurality of functional compute blocks. The system is capable of determining the dataflows for the ML primitive based on the memory architecture available in the target hardware. In one example, the memory architecture includes 3 categories of locality of the available memory that may be used in creating the dataflow. The categories of locality can include global, shared, and local. The system can define the dataflows and memory locality for the ML primitive. The system is capable of determining the dataflow by defining the various buffers to be used and the data transfers necessary to move data in the memory architecture of the target hardware to implement the ML primitive.

In one aspect, the system creates the locality of memory based on the amounts of data to be processed by the compute node primitive. In general, data is moved from global memory to shared memory and from shared memory to local memory. The compute circuit, in executing one or more compute node primitives, performs computations on the data. The results may then be moved from local memory, to shared memory, and on to global memory. The global, shared, and local memories correspond to particular memories in the target hardware. Each data movement may be represented in the intermediate representation as a transaction.

For purposes of illustration, consider an example of a compute node primitive that is mapped to a particular compute tile. The data corresponding to weights and activations, e.g., a buffer for each type of data, may be transferred from global memory, to shared memory, and to local memory. Each data transfer of a buffer from one type of memory to another is represented as a separate transaction in the intermediate representation. Subsequent to performing the matrix multiply operation on the data, the result, e.g., a buffer, is moved from local memory to shared memory. If another operation such as ReLU is to be performed on the result from the matrix multiply operation, the data is moved from the shared memory back to local memory so that the compute tile may perform ReLU.

As part of the optimization phase of block 112, the system is capable of inserting one or more compiler directives that are usable during a compilation phase that generates the overlay specifying the dataflow. The system is capable of inserting compiler directives that facilitate proper translation of the intermediate representation into the overlay. The compiler directives may indicate the number of parallel compute node primitives to be used (e.g., the number hardware resources to be used in mapping the compute node primitives to the hardware resources), memory utilization limits, or the like.

For example, depending on data throughput requirements that may be specified for the layer, the system may choose to implement a given compute node using a single compute node primitive mapped to a single hardware resource or implement the compute node using a plurality of instances of the compute node primitive where each instance is implemented by a different hardware resource resulting in a plurality of such hardware resources operating in parallel to implement the compute node. The system is also capable of inserting compiler directives that specify backend parameters that can be passed to the backend compiler for the target hardware along with the overlay. The compiler may use the parameters to synthesize the overlay.

An example compiler directive is the "operation fusion." For purposes of illustration, consider the prior example where ReLU is to be performed on the results from the matrix multiply operation. In that case, the compute node mapped to the hardware resource (e.g., a compute tile) may include a compute node primitive for performing a matrix multiply operation and a compute node primitive for performing ReLU. Because the same compute tile is performing both operations, the system determines that a given buffer is written from local memory to shared memory only to be returned from shared memory to local memory to perform ReLU. In this example, there is no need to transfer a data buffer from local memory of the compute tile to shared memory only to transfer the same data back to the compute tile to perform ReLU. Accordingly, the system is capable of modifying the intermediate representation so that results from the matrix multiply operation are maintained in the local memory of the compute tile. The ReLU compute node primitive may then access the data directly from the local memory. Subsequent to performing ReLU, the data may be written back to shared memory thereby reducing the number of data transfers to be performed in the target hardware.

Figure 11:
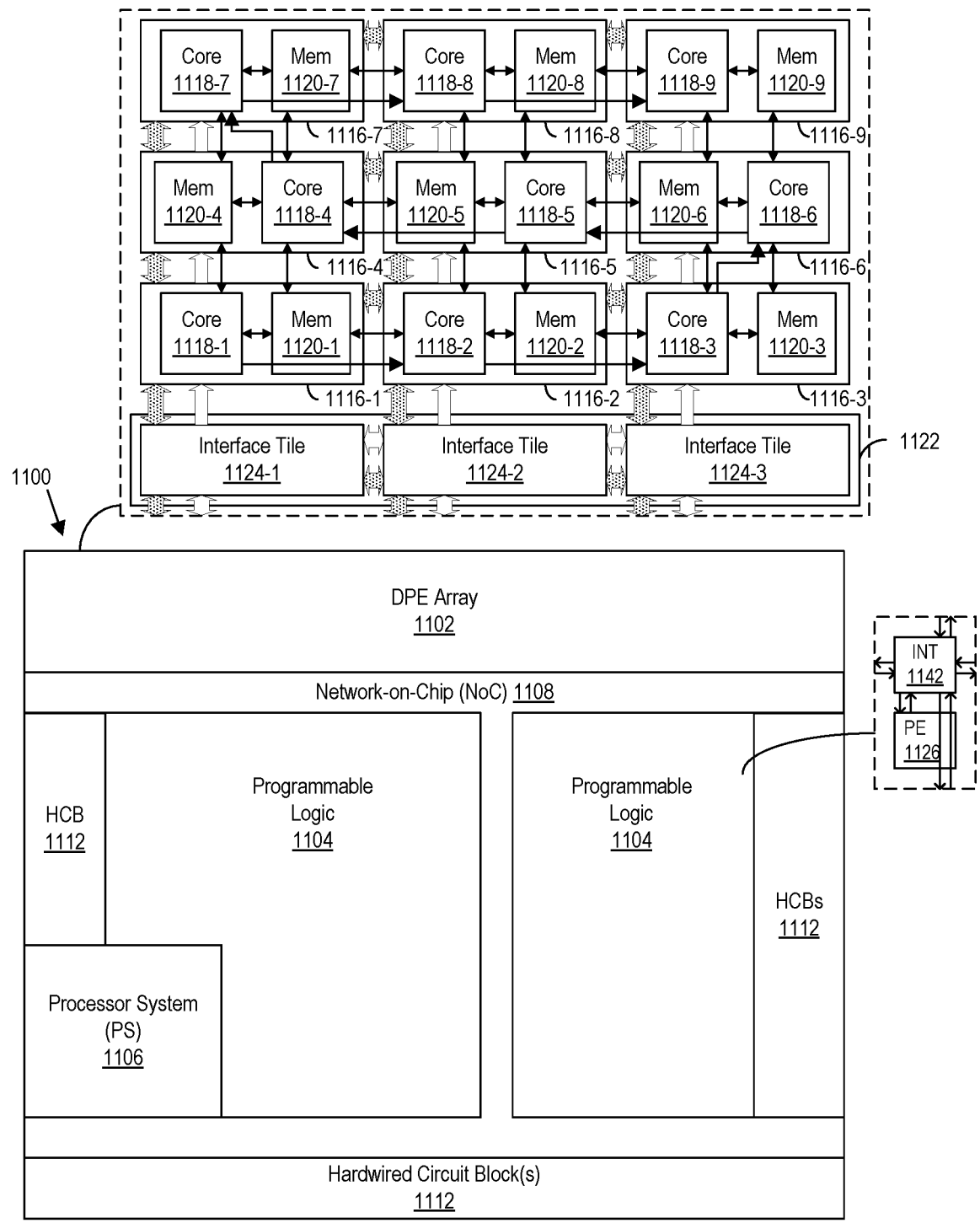
FIG. 11 illustrates an example architecture for an integrated circuit.
Figure 12:
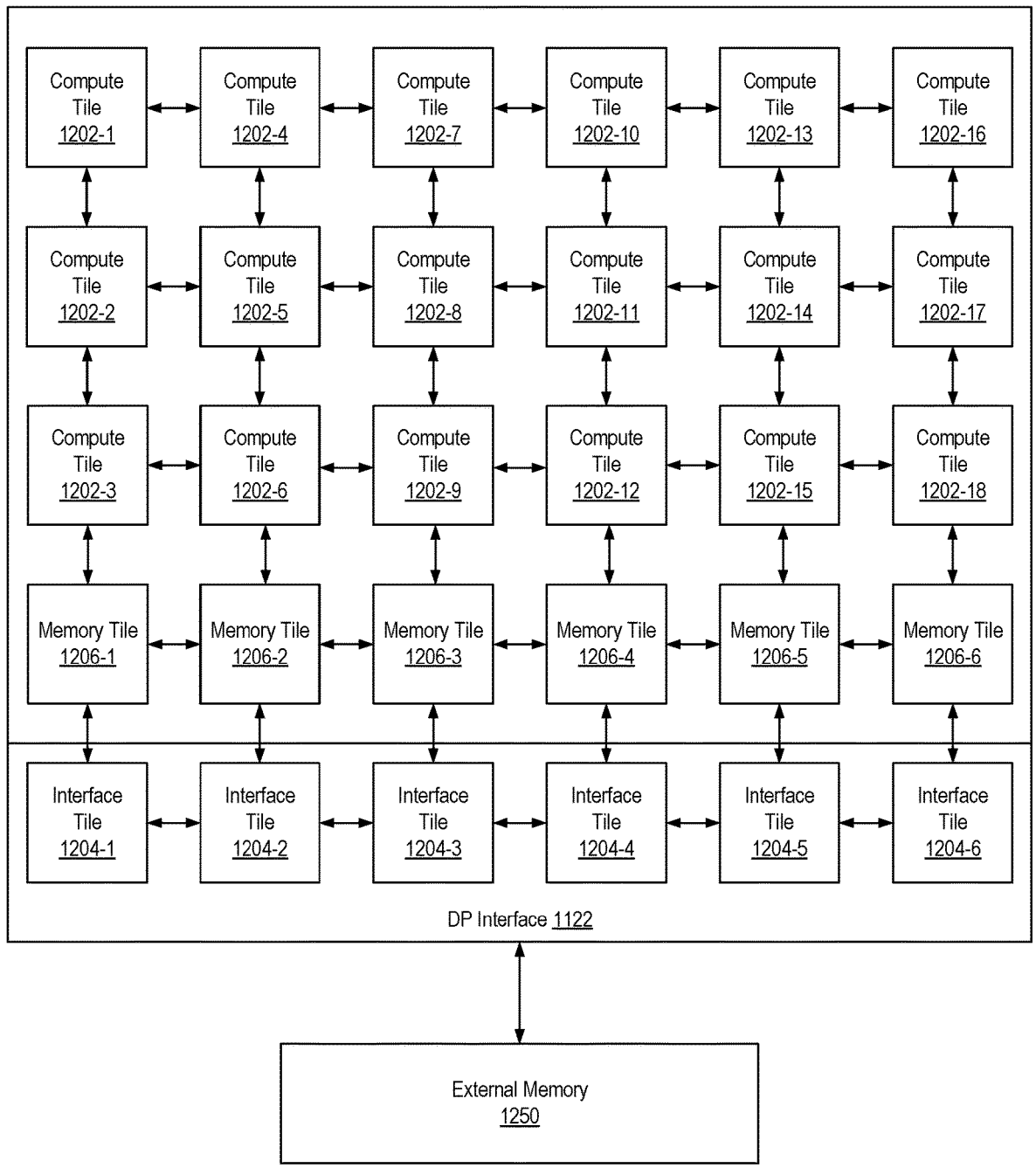
FIG. 12 illustrates an example implementation of a data processing array.

FIG. 8 illustrates an example of the ML primitive after the system has inserted one or more compiler directives therein. In the example of FIG. 8, the system has inserted the compiler directives indicating that particular data transfers between different localities of the memory architecture are to be performed as direct memory access (DMA) transfers. These compiler directives target the particular architecture of the target hardware. An example of target hardware is illustrated in the example of FIGS. 11 and 12.

In the example of FIG. 8, the system has also included attributes defining the locality of the memory used by the ML primitive. Referring to FIG. 8, "A_2" in line 3 refers to the entirety of the input tensor that resides in a "global" memory. In general, the term "global memory" refers to a memory such as a RAM (e.g., a Double Data Rate (DDR) Synchronous Dynamic RAM (SDRAM)) where the global memory is typically of higher capacity than shared and/or local memories. The global memory is also characterized by longer access times. In the case of FIGS. 11 and 12, for example, global memory may be external memory 1250.

In the example of FIG. 8, "A.shared" in line 8 refers to a shared memory that is accessible to all or some compute nodes. A shared memory is characterized by faster access times than a global memory. A hardware architecture may include multiple shared memories, where each may be shared between a subset of compute nodes. In one aspect, a shared memory is akin to a cache memory that provides faster access to a data set that is larger than what may be stored locally for a compute node.

A local memory may be specific to a given compute node. A compute node is capable of reading data from a shared memory, processing the data using a local memory, and copying the results back to the shared memory. In the example, "A.shared.local" at line 10 is the local memory of each of the compute nodes. In the example of FIG. 8, a subset of data is first transferred from "A_2" (global) memory to A.shared (shared) memory. Then a smaller subset of the A.shared (shared) memory is transferred to "A.shared.local" (local) memory of a compute node for processing. In the example of FIG. 8, the compute node continuously brings different blocks of the shared memory into the local memory with a transfer size of 8×64 until the entire shared memory is consumed. The output of the computation is first stored in a local memory called "res" but it is subsequently transferred to "A_2" (global) memory directly.

In one or more example implementations, the system is capable of determining dataflows and memory locality for the plurality of functional compute blocks based on the compute node primitive(s) being used and the target hardware. That is, the number of inputs received by a compute node primitive, the size of each input (e.g., argument), and the output generated by the compute node primitive are known. As such, the system may determine the number of buffers (e.g., where the number of buffers corresponds to the number of inputs and outputs of the compute node primitive) and size of each buffer (where size is determined according to the size of the inputs and/or outputs) needed to convey data along the memory hierarchy of the target hardware. Since the memory hierarchy of the target hardware is known, the memory locality may be determined to effectuate the data transfers, e.g., movement of the inputs in their respective buffers among the various levels of available memory (e.g., global, shared, and local), for processing on the target hardware and the movement of the outputs in their respective buffer(s) among the various levels of available memory for providing output.

In block 114, the system is capable of generating the overlay for the ML primitive by compiling the intermediate representation thereof. The system may perform a compilation of the intermediate representation. The compilation may include mapping the functional compute blocks of the intermediate representation of the ML primitive to one or more of the compute node primitives. The mapping may map each iteration of the functional compute block to a particular instance of the compute node primitive (e.g., whether a same instance or multiple different instances depending on data throughput requirements of the ML design).

Generation of the synthesizable overlay allows the system to leverage the capabilities of the back-end compiler resulting in an improved realization of the ML design. Other conventional approaches translate the intermediate representation of the ML primitive into a set of machine-level codes that are specific to the target hardware. This often results in an inefficient realization of the ML design for purposes of hardware acceleration that may not be ported to different target hardware and/or newer generations of the target hardware.

In one aspect, in block 114, the system is capable of translating each functional compute unit into synthesizable code corresponding to a particular compute node primitive of the target hardware. The system, in performing the translation, is capable of utilizing the Application Programming Interfaces (APIs) of the back-end compiler for the target hardware. In one or more example implementations, the system uses the Tensorize feature of TVM to generate the synthesizable code (e.g., the overlay) for hardware accelerating the ML primitive. In one aspect, during compilation to generate the overlay, the system is capable of replacing the portions of the intermediate representation corresponding to the functional compute blocks (e.g., as sliced and/or tiled) with the compute node primitive(s).

In one or more other example implementations, where predetermined compute node primitives are not available, the system is capable of providing the functional compute blocks from the intermediate representation to the back-end compiler. The back-end compiler is capable of generating the compute node primitive(s) at compile time. In that case, the system is capable of providing parameters of the functional compute blocks to the back-end compiler, which generates the compute node primitive(s) based on the provided parameters.

In either the case of mapping the functional compute blocks to predetermined compute node primitives or mapping the functional compute blocks to compute node primitives that are generated by the back-end compiler, the system is capable of physically allocating the compute node primitives to specific hardware resources of the target hardware to implement the compute node.

As part of block 114, the system is also capable of including one or more data nodes that are used to transfer data into and out of the compute node(s). The need for data nodes may be determined by the system based on the dataflow and memory locality previously determined in block 116. The introduction of data nodes, e.g., memories, facilitates distributed computing in the target hardware. For example, in the case where the target hardware is an IC, the data nodes allow the dataflow to span multiple different heterogeneous hardware resources in the IC, each capable of implementing a compute node (e.g., one or more compute node primitives). As an illustrative and non-limiting example, the inclusion of one or more data nodes allows higher throughput in the IC to be achieved among different compute circuits such as compute tiles of a data processing array, accelerators implemented in programmable logic, GPUs, and the like which may be implemented in a same IC.

The system, as part of block 114, is capable of instantiating the compute node(s) and the data node(s) to create the overlay. The overlay may be specified in high-level programming language as a dataflow graph. The system is capable of parsing the memory scopes and accesses of the intermediate representation based on the for-loop structure and the injected compiler directives of the intermediate representation. The system is capable of instantiating buffers in accordance with the memory architecture of the target hardware. For example, the system instantiates global buffers, shared buffers, and local buffers. The system further associates ports with the instantiated buffers. The system is also capable of instantiating any data formatting blocks to reformat data before passing the data to the compute node primitive.

In creating the overlay, the system combines the different elements of the ML primitive implementation by instantiating input and output ports for the overlay. The overlay, as generated by the system, describes the top-level dataflow between the different components of the ML primitive or primitives as the case may be.

Figure 9:
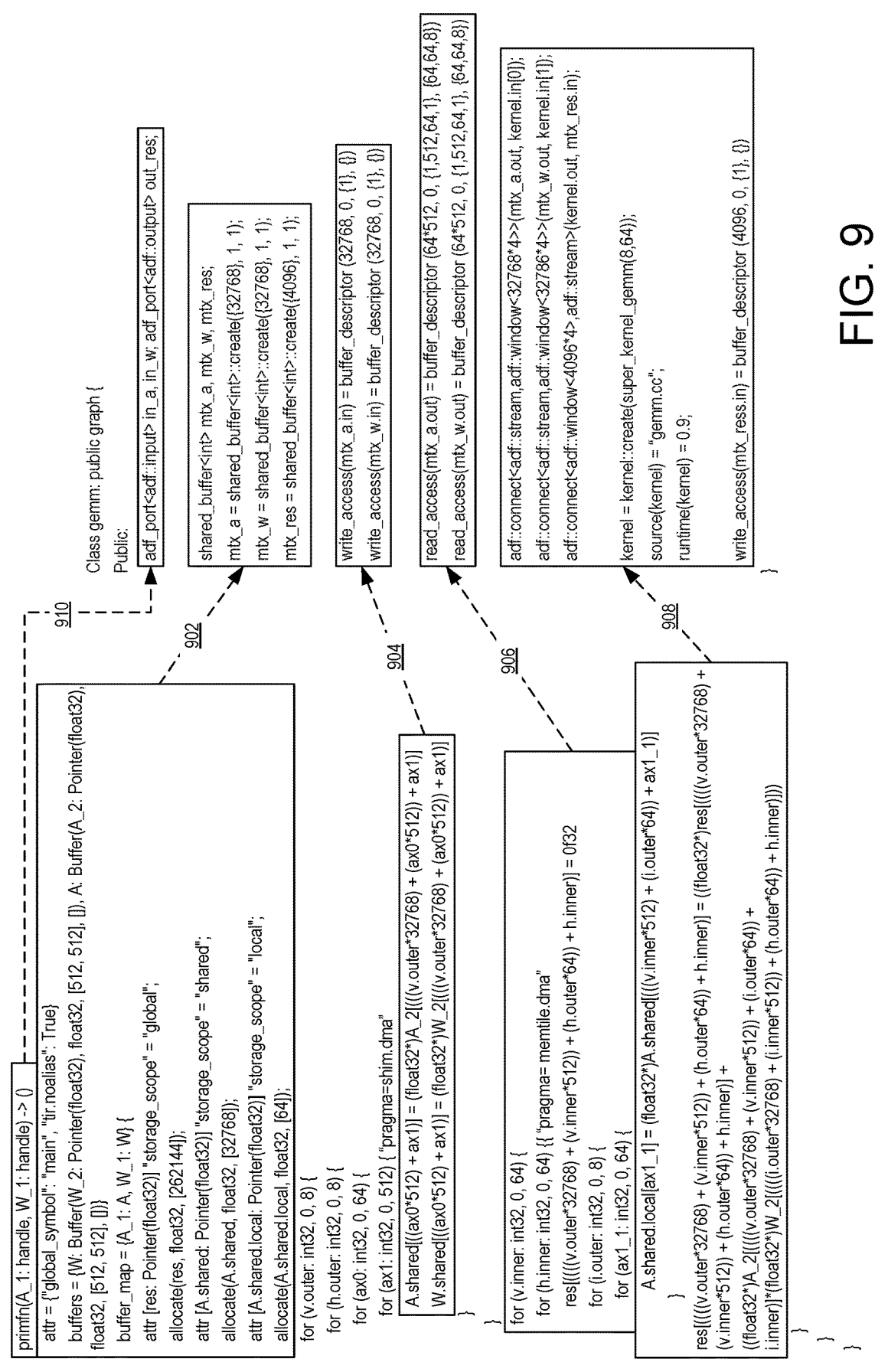

FIG. 9 illustrates an example of a synthesizable overlay generated from an ML primitive. More particularly, the right column illustrates a synthesizable overlay generated from the intermediate representation in the left column. In the example of FIG. 9, block 902 defines the memory structure that exists in the corresponding portion of the intermediate representation on the left. For purposes of illustration, only the A buffer memory scopes are illustrated in the intermediate representation. It should be appreciated that the W buffer and the RES buffer are also defined as shared memories in the architecture of the target hardware.

Blocks 904 and 906 represent the generated memory accesses of buffers described in block 902 for performing the computation. The memory accesses defined in blocks 904 and 906 are based on the data access patterns described in the respective and corresponding blocks in the intermediate representation in the left column. Block 908 shows the conversion of the corresponding portion of the intermediate representation into a pre-generated compute node in the backend. The compute node uses data transferred by block 906 to perform the matrix multiplication operation. Block 910 defines the input ports and the output ports of the generated overlay based on the global memory accesses in the intermediate representation. The "global" memory represents the boundary between the overlay and the external host that uses the overlay.

In block 118, the system is capable of scheduling the overlay for implementation in the target hardware. The system is capable of scheduling the overlay as part of the larger ML design that included the original ML primitive. The scheduling performed in block 118 integrates the overlay that is generated with a runtime framework that may be executed by a processor or other controller. The scheduling determines the order in which the overlay is loaded within the larger context of the ML design. The scheduling further determines the number of times the overlay is invoked at each stage of execution of the ML design. In general, the scheduling invokes the overlay at different stages of the execution of the ML design based on the number of times the same execution pattern for the operation exists in the intermediate representation of ML design 102.

FIG. 10 illustrates an example in which the system generates scheduling program code. The scheduling program code may be integrated into a runtime executed by a processor or controller to control the implementation of the overlay within the target hardware. Referring to FIGS. 9 and 10, FIG. 9 represents the overall structure for one instance of a computation that is capable of performing a 64×64 matrix multiplication operation. The overlay may be invoked for the entirety of the computation by an external host system such as a CPU, a microcontroller, or the like. If the computation size is larger than what may be performed by the overlay, the overlay may be invoked multiple times to compute the result. Block 1004 represents one invocation of the overlay in FIG. 9. Block 1002 represents a number of times the overlay needs to be invoked to compute a 512×512 matrix multiplication problem.

In block 120, the overlay may be synthesized into a hardware implementation for the target hardware system. For example, the system is capable of providing the overlay to the back-end compiler. The back-end compiler, which may be executed by the system or another data processing system, synthesizes the overlay into an application, e.g., program code and/or configuration data, that may be loaded into the target hardware to implement the ML primitive as part of an ML design. The runtime, as executed by a processor or other controller, is capable of controlling the timing and number of times that the hardware accelerated ML primitive is invoked in the target hardware.

In the examples provided herein, the overlay was implemented as a customized general matrix multiplication overlay that is capable of handling the execution of any of a variety of differently sized matrix multiplication problems. It should be appreciated that the techniques described within this disclosure may be applied to other linear and/or non-linear ML primitives that can be translated into a set of mathematical operations and for-loop structures.

FIG. 11 illustrates an example architecture for an IC 1100. IC 1100 is an example of a programmable IC and adaptive hardware. In one aspect, IC 1100 is also an example of a System-on-Chip (SoC). In the example of FIG. 11, IC 1100 is implemented on a single die provided within a single integrated package. In other examples, IC 1100 may be implemented using a plurality of interconnected dies where the various programmable circuit resources illustrated in FIG. 11 are implemented across the different interconnected dies.

In the example, IC 1100 includes a data processing (DP) array 1102, programmable logic 1104, a processor system 1106, a Network-on-Chip (NoC) 1108, and one or more hardwired circuit blocks 1112. It should be appreciated that the architecture of IC 1100 is provided for purposes of illustration and not limitation. An IC for use with the inventive arrangements described herein may include any of a variety of combinations of the subsystems described herein.

DP array 1102 is implemented as a plurality of interconnected and programmable compute tiles 1116. The term "tile," as used herein in connection with FIG. 11, means a circuit block. Compute tiles 1116 may be arranged in an array and are hardwired. Each compute tile 1116 can include one or more cores 1118 and a memory circuit (abbreviated "Mem" in FIG. 11) 1120. In one aspect, each core 1118 is capable of executing program code stored in a core-specific program memory contained within each respective core (not shown). In one aspect, each core 1118 may be implemented as a vector processor.

In one or more examples, each core 1118 is capable of directly accessing the memory circuit 1120 within the same compute tile 1116 and the memory circuit 1120 of any other compute tile 1116 that is adjacent to the core 1118 of the compute tile 1116 in the up, down, left, and/or right directions. For example, core 1118-5 is capable of directly reading and/or writing (e.g., via respective memory interfaces not shown) memory circuits 1120-5, 1120-8, 1120-6, and 1120-2. Core 1118-5 sees each of memory circuits 1120-5, 1120-8, 1120-6, and 1120-2 as a single, unified region of memory (e.g., as a part of the local memory accessible to core 1118-5). This facilitates data sharing among different compute tiles 1116 in DP array 1102. In other examples, core 1118-5 may be directly connected to memory circuits 1120 in other compute tiles.

Compute tiles 1116 are interconnected by programmable interconnect circuitry. The programmable interconnect circuitry may include one or more different and independent networks. For example, the programmable interconnect circuitry may include a streaming network formed of streaming connections (shaded arrows) and a memory-mapped network formed of memory-mapped connections (unshaded arrows).

Cores 1118 may be directly connected with adjacent cores 1118 via core-to-core cascade connections. In one aspect, core-to-core cascade connections are unidirectional and direct connections between cores 1118 as pictured. In another aspect, core-to-core cascade connections are bidirectional and direct connections between cores 1118. In general, core-to-core cascade connections generally allow the results stored in an accumulation register of a source core 1118 to be provided directly to an input of a target or load core 1118 without traversing the programmable interconnects and/or being written by a first core 1118 to a memory circuit 1120 to be read by a different core 1118.

In an example implementation, compute tiles 1116 do not include cache memories. By omitting cache memories, DP array 1102 is capable of achieving predictable, e.g., deterministic, performance. Further, significant processing overhead is avoided since maintaining coherency among cache memories located in different compute tiles 1116 is not required. In a further example, cores 1118 do not have input interrupts. Thus, cores 1118 are capable of operating uninterrupted. Omitting input interrupts to cores 1118 also allows DP array 1102 to achieve predictable, e.g., deterministic, performance.

DP interface 1122 operates as an interface that connects compute tiles 1116 to other resources of IC 1100. In the example of FIG. 11, DP interface 1122 includes a plurality of interconnected interface tiles 1124 organized in a row. Interface tiles 1124 are connected so that data may be propagated from one interface tile to another bi-directionally. Each interface tile 1124 is capable of operating as an interface for the column of compute tiles 1116 directly above and is capable of interfacing such compute tiles 1116 with components and/or subsystems of IC 1100 including, but not limited to, programmable logic 1104 and/or NoC 1108. It should be appreciated that DP array 1102 may include memory tiles (not shown) that may be interspersed with the compute tiles 1116 illustrated.

Programmable logic 1104 is circuitry that may be programmed to perform specified functions. As an example, programmable logic 1104 may be implemented as field-programmable gate array type of circuitry. Programmable logic 1104 can include an array of programmable circuit blocks. As defined herein, the term "programmable logic" means circuitry used to build reconfigurable digital circuits. Programmable logic is formed of many programmable circuit blocks that provide basic functionality. The topology of programmable logic is highly configurable unlike hardwired circuitry. Each programmable circuit block of programmable logic 1104 typically includes a programmable element 1126 (e.g., a functional element) and a programmable interconnect 1142. The programmable interconnects 1142 provide the highly configurable topology of programmable logic 1104. The programmable interconnects 1142 may be configured on a per wire basis to provide connectivity among the programmable elements 1126 of programmable circuit blocks of programmable logic 1104 and is configurable on a per-bit basis (e.g., where each wire conveys a single bit of information) unlike connectivity among compute tiles 1116, for example, that may include multi-bit stream connections capable of supporting packet-based communications.

Processor system 1106 is implemented as hardwired circuitry that is fabricated as part of IC 1100. Processor system 1106 may be implemented as, or include, any of a variety of different processor types each capable of executing program code. For example, processor system 1106 may be implemented as one or more processors. Each processor may include one or more cores. Each processor and/or core is capable of executing program code. In still another example, processor system 1106 may include one or more processors, cores, modules, co-processors, I/O interfaces, and/or other resources. Processor system 1106 may be implemented using any of a variety of different types of architectures. Example architectures that may be used to implement processors and/or cores of processor system 1106 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like. In one or more example implementations, processor system 1106 may execute a control program that controls execution of an application (e.g., one or more kernels) within DP array 1102.

In one or more example implementations, processor system 1106 may execute a control program (e.g., the runtime) that controls execution of an application (e.g., one or more kernels and/or layers of an ML design) within DP array 1102.

NoC 1108 is a programmable interconnecting network for sharing data between endpoint circuits in IC 1100. The endpoint circuits can be disposed in DP array 1102, programmable logic 1104, processor system 1106, and/or selected hardwired circuit blocks 1112. NoC 1108 can include high-speed data paths with dedicated switching. In an example, NoC 1108 includes one or more horizontal paths, one or more vertical paths, or both horizontal and vertical path(s). The arrangement and number of regions shown in FIG. 11 is merely an example. NoC 1108 is an example of the common infrastructure that is available within IC 1100 to connect selected components and/or subsystems.

Within NoC 1108, the nets that are to be routed through NoC 1108 are unknown until a user circuit design is created for implementation within IC 1100. The term "user" refers to a human being. NoC 1108 may be programmed by loading configuration data into internal configuration registers that define how elements within NoC 1108 such as switches and interfaces are configured and operate to pass data from switch to switch and among the NoC interfaces to connect the endpoint circuits. NoC 1108 is fabricated as part of IC 1100 (e.g., is hardwired) and, while not physically modifiable, may be programmed to establish connectivity between different master circuits and different slave circuits of a user circuit design. NoC 1108, upon power-on, does not implement any application data paths or routes therein, but may provide default paths for loading configuration data into selected other subsystems. Once configured, however, NoC 1108 implements data paths or routes between endpoint circuits.

Hardwired circuit blocks 1112 include special-purpose circuit blocks fabricated as part of IC 1100. Though hardwired, hardwired circuit blocks 1112 may be configured by loading configuration data into control registers to implement one or more different modes of operation. Examples of hardwired circuit blocks 1112 may include input/output (I/O) blocks, transceivers for sending and receiving signals to circuits and/or systems external to IC 1100, memory controllers, or the like. Examples of different I/O blocks may include single-ended and pseudo differential I/Os. Examples of transceivers may include high-speed differentially clocked transceivers. Other examples of hardwired circuit blocks 1112 include, but are not limited to, cryptographic engines, digital-to-analog converters (DACs), analog-to-digital converters (ADCs), GPUs, and the like. In general, hardwired circuit blocks 1112 are application-specific circuit blocks.

In one or more other examples, hardwired circuit blocks 1112 may include a RAM, e.g., one or more banks of RAM. As an example, the RAM may be a Double Data Rate (DDR) Synchronous Dynamic RAM. In still another example, hardware circuit blocks 1112 may include a High-Bandwidth Memory (HBM).

The various programmable circuit resources illustrated in FIG. 11 may be programmed initially as part of a boot process for IC 1100. During runtime, the programmable circuit resources may be reconfigured. At any point during runtime, all or a portion of IC 1100 may be reconfigured. In some cases, processor system 1106 or another processing system disposed in IC 1100 may configure and/or reconfigure programmable logic 1104 and/or NoC 1108.

FIG. 12 illustrates another example implementation of DP array 1102. In the example of FIG. 12, DP array 1102 is implemented substantially similar to the example of FIG. 11. In the example of FIG. 12, however, DP array 1102 also includes memory tiles. As shown, in the example, compute tiles 1202 and memory tiles 1206 are arranged in a grid having a plurality of rows and columns. Interface tiles 1204 are arranged in a row where the individual interface tiles 1204 are aligned with the columns of the grid arrangement of DP array 1102.

In one or more other examples, memory circuits 1120, memory tiles 1206, and interface tiles 1124, 1204 include DMA circuits that are capable of transferring data over the various interconnect networks described to effectuate the flow of data.

The example of FIG. 12 is provided for purposes of illustration only. The number of tiles in a given column and/or row, the number of tiles included in DP array 1102 and/or DP interface 1122, the sequence or order of tile types (e.g., memory and compute tiles) in a column and/or row is for purposes of illustration and not limitation. Other arrangements may be included with varying numbers of tiles, rows, columns, mixtures of tile types, and the like. For example, rows of FIG. 12 are homogeneous in terms of tile type while columns are not. In other arrangements, rows may be heterogeneous in terms of tile type while columns are homogeneous. In some arrangements, additional rows of memory tiles 1206 may be included in DP array 1102. Such rows of memory tiles 1206 may be grouped together without intervening rows of compute tiles 1202 or distributed throughout DP array 1102 such that rows of compute tiles 1202 do intervene between rows or groups of rows of memory tiles 1206.

In the example of FIG. 12, DP array 1102 may be included in an IC and communicatively linked to an external memory 1250. External memory 1250 may be an external RAM.

Figure 13:
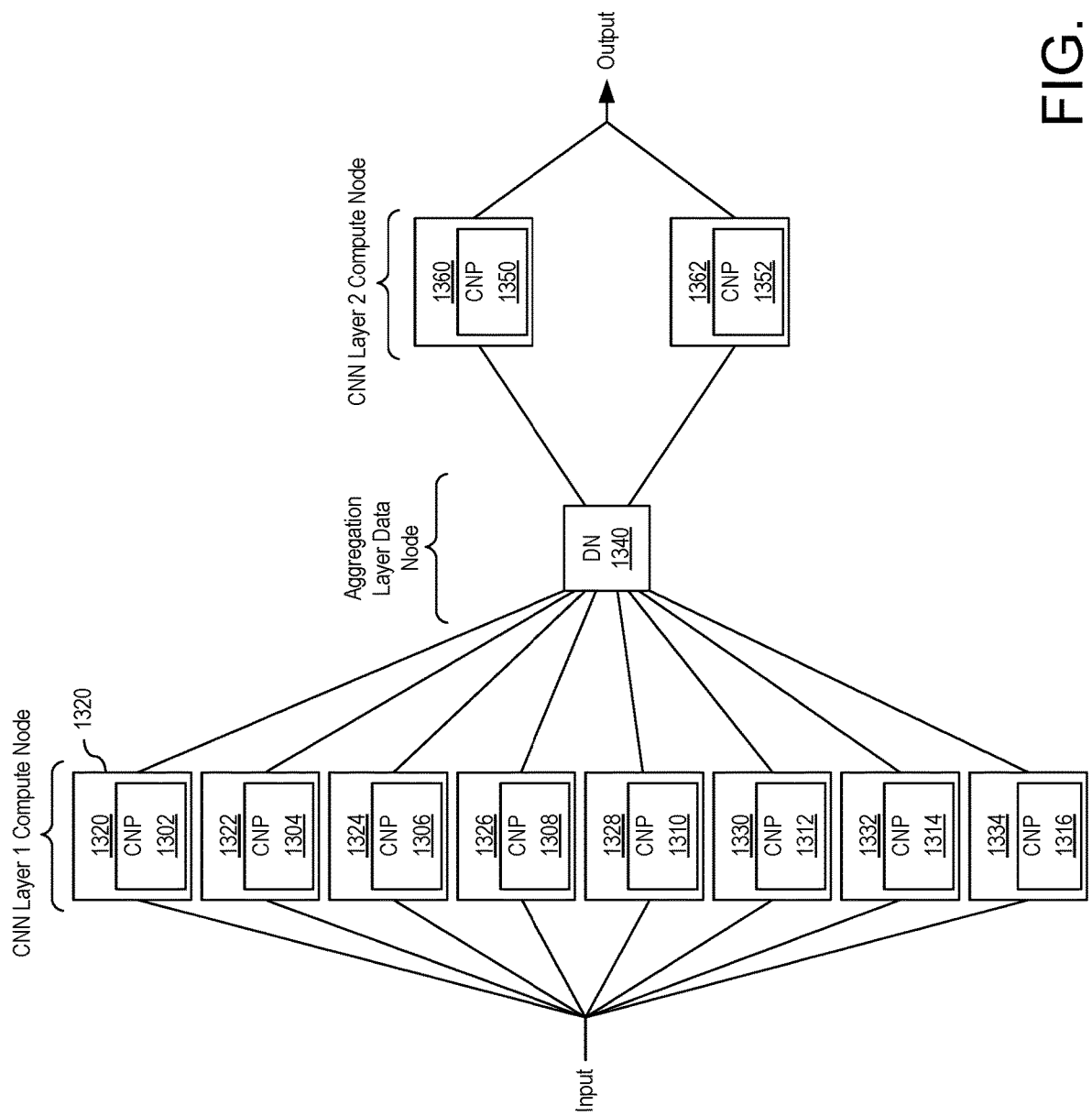
FIG. 13 illustrates an example implementation of an overlay.

FIG. 13 illustrates an example implementation of an overlay. The example of FIG. 13 illustrates an overlay that is configured to implement a CNN and, more particularly, a plurality of layers of a super-resolution CNN. In the example of FIG. 13, as is the case in many image classification systems, the first few layers have a higher compute density than subsequent layers. Many state-of-the-art ML designs for image classification have linear and non-linear compute node primitives requiring that ML primitives such as linear, dense, convolution, and non-linear activations be mapped to available hardware resources.

The example overlay of FIG. 13 accommodates feature map sizes that remain relatively true to the original dimensions of the input data and provides an increased number of data channels. For purposes of illustration, the ML design implemented by the overlay of FIG. 13 includes a first layer implemented as a CNN layer, a second layer implemented as an aggregation layer, and a third layer implemented as a second CNN layer. The first layer is implemented by a compute node referred to as the CNN layer 1 compute node. The second layer is implemented by a data node referred to as the aggregation layer data node. The third layer is implemented by a compute node referred to as the CNN layer 2 compute node. As shown, to leverage data parallelism and increased throughput of the overall network, the CNN layer 1 compute node is implemented using 8 instances of a compute node primitive (CNP) shown as CNPs 1302, 1304, 1306, 1308, 1310, 1312, 1314, and 1316. Each instance of the CNP is allocated or mapped to a different hardware resource 1320, 1322, 1324, 1326, 1328, 1330, 1332, and 1334 so that each CNP of the first layer may operate in parallel. In this example, the compute node primitives are kernels and the hardware resources to which each kernel is mapped or allocated are compute tiles 1116, 1202 of DP array 1102.

Output feature maps generated by the respective compute node primitives of the first layer are provided to, and aggregated by, data node 1340. In the example of FIG. 13, data node 1340 may be implemented as a memory tile 1206. Memory tile 1206 is an example of a shared memory. In another aspect, data may be aggregated by way of a dataflow mechanism. The output feature maps generated by the CNN compute node may be aggregated in order by data node 1340 and output to the CNN layer 2 compute node. The CNN layer 2 compute node is distributed across 2 compute node primitives 1350, 1352 allocated to hardware resource 1360, 1362, respectively. In this example, each compute node primitive may be a kernel and the hardware resource implementing each of the kernels is a compute tile 1116, 1202.

The term "dataflow mechanism" refers to the circuit architecture used to convey data from external memory to the compute nodes and send results back to a host system. In this example, the dataflow mechanism refers to memory locality (e.g., global, shared, and local memory), memory size, memory resource allocations (e.g., memory banks, locks, routing, etc.), memory access path (e.g., memory-to-stream, memory-to-memory communication), and access patterns.

In one aspect, the underlying CNP for performing the convolution operation and activation (e.g., ReLU or Leakly-ReLU) may be the same for each of the 8 hardware resources of the CNN layer 1 compute node and for each of the 2 hardware resources of the CNN layer 2 compute node.

Referring to the example hardware illustrated in FIGS. 11 and 12, a compute node for a layer of an ML design may be implemented as one or more kernels executed on one or more compute tiles, one or more kernels implemented in programmable logic, program code executing on one or more CPUs, program code executing on one or more GPUs. Depending on the amount of data throughput needed for each layer, the compute node may be implemented using one or more instances of the compute node primitive, where each instance is allocated to a different hardware resource. In the case of a kernel intended for implementation in programmable logic, each instance of the kernel implements an independent copy of the compute circuit (e.g., accelerator) in programmable logic. Data nodes may be implemented as shared memory in programmable logic (e.g., block-RAMs), shared memory in memory tiles 1206 (e.g., SRAMs), and/or as shared memory in other on-chip RAM.

Figure 14:
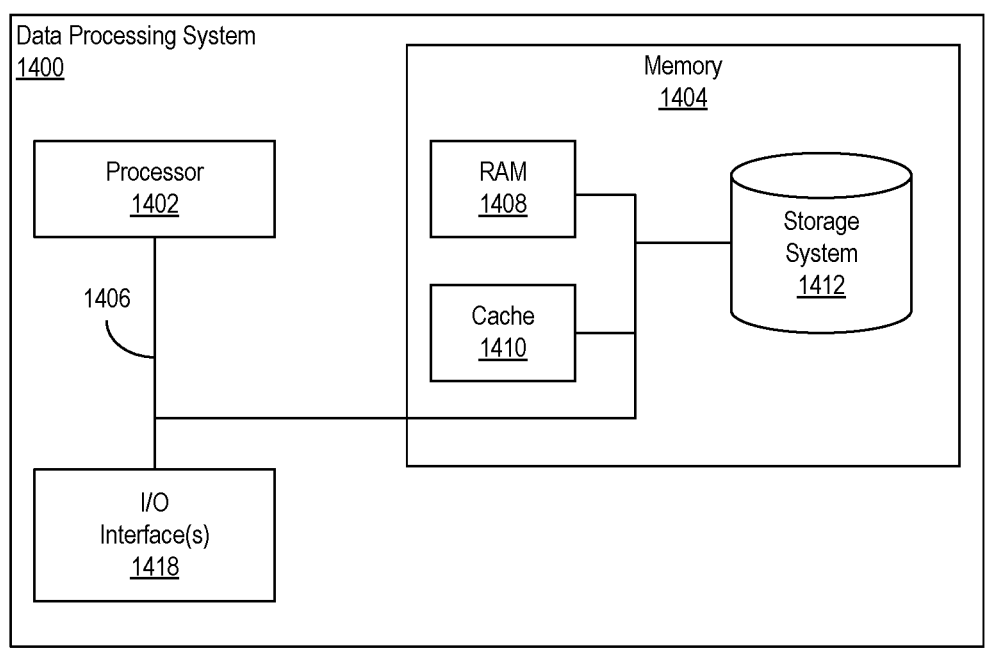
FIG. 14 illustrates an example implementation of a data processing system for use with the inventive arrangements described herein.

FIG. 14 illustrates an example implementation of a data processing system 1400. As defined herein, the term "data processing system" means one or more hardware systems configured to process data, each hardware system including at least one processor and memory, wherein the processor is programmed with computer-readable instructions that, upon execution, initiate operations. Data processing system 1400 can include a processor 1402, a memory 1404, and a bus 1406 that couples various system components including memory 1404 to processor 1402.

Processor 1402 may be implemented as one or more processors. In an example, processor 1402 is implemented as a CPU. Processor 1402 may be implemented as one or more circuits capable of carrying out instructions contained in program code. The circuit may be an integrated circuit or embedded in an integrated circuit. Processor 1402 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1406 represents one or more of any of a variety of communication bus structures. By way of example, and not limitation, bus 1406 may be implemented as a Peripheral Component Interconnect Express (PCIe) bus. Data processing system 1400 typically includes a variety of computer system readable media. Such media may include computer-readable volatile and non-volatile media and computer-readable removable and non-removable media.

Memory 1404 can include computer-readable media in the form of volatile memory, such as random-access memory (RAM) 1408 and/or cache memory 1410. Data processing system 1400 also can include other removable/non-removable, volatile/non-volatile computer storage media. By way of example, storage system 1412 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1406 by one or more data media interfaces. Memory 1404 is an example of at least one computer program product.

Memory 1404 is capable of storing computer-readable program instructions that are executable by processor 1402. For example, the computer-readable program instructions can include an operating system, one or more application programs, other program code, and program data. Processor 1402, in executing the computer-readable program instructions, is capable of performing the various operations described herein that are attributable to a computer. For example, data processing system 1400 may execute program code (e.g., an EDA system and/or one or more compilers as described herein) that configures or programs processor 1402 to perform the various operations described herein relating to hardware accelerating an ML design or portion of an ML design.

It should be appreciated that data items used, generated, and/or operated upon by data processing system 1400 are functional data structures that impart functionality when employed by data processing system 1400. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1400 may include one or more Input/Output (I/O) interfaces 1418 communicatively linked to bus 1406. I/O interface(s) 1418 allow data processing system 1400 to communicate with one or more external devices and/or communicate over one or more networks such as a local area network (LAN), a wide area network (WAN), and/or a public network (e.g., the Internet). Examples of I/O interfaces 1418 may include, but are not limited to, network cards, modems, network adapters, hardware controllers, etc. Examples of external devices also may include devices that allow a user to interact with data processing system 1400 (e.g., a display, a keyboard, and/or a pointing device) and/or other devices such as accelerator card.

Data processing system 1400 is only one example implementation. Data processing system 1400 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 14 is not intended to suggest any limitation as to the scope of use or functionality of example implementations described herein. Data processing system 1400 is an example of computer hardware that is capable of performing the various operations described within this disclosure. In this regard, data processing system 1400 may include fewer components than shown or additional components not illustrated in FIG. 14 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   translating a machine learning (ML) primitive into an intermediate representation;
   subdividing the intermediate representation to specify a functional compute block, wherein the functional compute block is sized according to a compute node primitive adapted for implementing the ML primitive on target hardware;
   generating an overlay for the ML primitive, at least in part, by mapping the functional compute block to the compute node primitive, wherein the overlay is synthesizable to implement the ML primitive on the target hardware; and
   scheduling the overlay for operation within the target hardware as part of an ML design including the ML primitive.

2. The method of claim 1, further comprising:
   synthesizing the overlay into a hardware implementation for the target hardware.

3. The method of claim 1, further comprising:
   determining dataflows and memory locality for the functional compute block.

4. The method of claim 3, further comprising:
   instantiating one or more data nodes within the overlay based on the dataflows, wherein each data node specifies a type of memory.

5. The method of claim 4, wherein the types of memory correspond to a memory hierarchy of the target hardware including global memory, shared memory, and local memory.

6. The method of claim 1, wherein the compute node primitive is hardware-specific.

7. The method of claim 1, wherein the intermediate representation is specified as a set of mathematical operations arranged in a loop hierarchy, and wherein the loop hierarchy defines the functional compute block.

8. The method of claim 1, wherein the functional compute block is sized to be wholly implemented by the compute node primitive.

9. A system, comprising:
   a processor configured to initiate operations including:
      translating a machine learning (ML) primitive into an intermediate representation;
      subdividing the intermediate representation to specify a functional compute block, wherein the functional compute block is sized according to a compute node primitive adapted for implementing the ML primitive on target hardware;
      generating an overlay for the ML primitive, at least in part, by mapping the functional compute block to the compute node primitive, wherein the overlay is synthesizable to implement the ML primitive on the target hardware; and
      scheduling the overlay for operation within the target hardware as part of an ML design including the ML primitive.

10. The system of claim 9, wherein the processor is configured to initiate operations further comprising:
    synthesizing the overlay into a hardware implementation for the target hardware.

11. The system of claim 9, wherein the processor is configured to initiate operations further comprising:
    determining dataflows and memory locality for the functional compute block.

12. The system of claim 11, wherein the processor is configured to initiate operations further comprising:
    instantiating one or more data nodes within the overlay based on the dataflows, wherein each data node specifies a type of memory.

13. The system of claim 12, wherein the types of memory correspond to a memory hierarchy of the target hardware including global memory, shared memory, and local memory.

14. The system of claim 9, wherein the compute node primitive is hardware-specific.

15. The system of claim 9, wherein the intermediate representation is specified as a set of mathematical operations arranged in a loop hierarchy, and wherein the loop hierarchy defines the functional compute block.

16. The system of claim 9, wherein the functional compute block is sized to be wholly implemented by the compute node primitive.

17. A computer program product, comprising:
one or more computer-readable storage media, and program instructions collectively stored on the one or more computer-readable storage media, wherein the program instructions are executable by computer hardware to initiate operations including:
translating a high-level, machine learning (ML) primitive into an intermediate representation;
subdividing the intermediate representation to specify a functional compute block, wherein the functional compute block is sized according to a compute node primitive adapted for implementing the ML primitive on target hardware;
generating an overlay for the ML primitive, at least in part, by mapping the functional compute block to the compute node primitive, wherein the overlay is synthesizable to implement the ML primitive on the target hardware; and
scheduling the overlay for operation within the target hardware as part of an ML design including the ML primitive.

18. The computer program product of claim 17, wherein the program instructions are executable by the computer hardware to initiate operations further comprising:
synthesizing the overlay into a hardware implementation for the target hardware.

19. The computer program product of claim 17, wherein the program instructions are executable by the computer hardware to initiate operations further comprising:
determining dataflows and memory locality for the functional compute block; and
instantiating one or more data nodes within the overlay based on the dataflows, wherein each data node specifies a type of memory.

20. The computer program product of claim 19, wherein the types of memory correspond to a memory hierarchy of the target hardware including global memory, shared memory, and local memory.

* * * * *